Patented May 25, 1948

2,442,018

UNITED STATES PATENT OFFICE 2,442,018

POLYVINYL BUTYRAL RESIN COMPOSITION

Richard W. Quarles, Pittsburgh, Pa., assignor to Carbide and Carbon Chemicals Corporation, a corporation of New York No Drawing. Application April 23, 1943,
Serial No. 484,237

1 Claim. (Cl. 260—19)

This invention relates to coating compositions for cloth containing polyvinyl partial butyral resins.

Combinations of certain polyvinyl partial butyral resins with compatible plasticizers are shown in Robertson Patent No. 2,162,678 to be suitable for coating fabric materials by reason of the high elasticity and tensile strength of such compositions. However, in compositions intended for coating cloth which is to be subjected to outdoor exposure in extremely warm climates under conditions of high humidity, as when the coated cloth is fabricated into tents and raincoats, the inherently thermoplastic nature of such compositions causes the coating to be excessively tacky. In addition, the thermoplastic polyvinyl partial butyral resins have insufficient resistance for many purposes to moisture and to solvents. Furthermore, plasticized polyvinyl partial butyral resins absorb moisture under conditions of high humidity, and exudation or "sweat-out" of the plasticizer occurs often because of its immiscibility with the water. On the other hand, water-miscible plasticizers would be readily washed out of the coating on immersion in water. These properties are a serious objection to the use in raincoats of cloth coated with the present compositions.

Accordingly, the object of the present invention is to provide a highly plasticized polyvinyl partial butyral composition for coating cloth which, after application and subsequent treatment, is non-thermoplastic and resistant to moisture and solvents, which does not "block" or become tacky at temperatures as high as 180° F., which is flexible at temperatures as low as 0° F., and which exhibits no "sweat-out" or exudation of the plasticizer, even under conditions of high humidity.

After extensive experimentation, it has been found that these objects can be achieved by combining the polyvinyl partial butyral resin with heat-reactive, soluble phenol-formaldehyde resins and compatible plasticizers to form a coating composition of a thermosetting or heat-curing type. This coating is applied to cloth, and the coated cloth is subjected to a controlled heat treatment at temperatures not exceeding about 350° F. As a result of the heat treatment, a coating is obtained which is insoluble in alcohol and many other organic liquids which are normally solvents for the uncured polyvinyl partial butyral resin, although both the original vinyl resin and the phenol resin are soluble in alcohol.

This insolubilization which occurs is believed not to be an additive effect caused solely by the insolubilization of the heat-reactive phenol-formaldehyde resin on heating; however, a conjoint curing reaction of some type between the polyvinyl partial butyral resin and the heat-reactive phenol-formaldehyde resin may be postulated. On the other hand, the phenol-formaldehyde resin, the acetal resin, and the plasticizer may be converted to an insoluble gel as a result of the heat treatment. In any event, the change in the properties of the coating is so pronounced as a result of the heat treatment, that an additive modification of the coating by the heat-reactive phenol resin is believed to be excluded by the evidence.

The heat-treated coating is non-thermoplastic, it does not soften on heating or in contact with its original solvents, it is highly resistant to boiling water and to prolonged soaking in water, it is non-tacky at temperatures as high as 180° F., and the plasticizer does not "sweat-out" in humid atmospheres. However, before the heat treatment, the coating is thermoplastic and may be rendered tacky by solvents, with or without the application of mild heating at temperatures below 150° F. This property is advantageous in that the seams of garments, such as raincoats, may be cemented together before the heat treatment. The final heat treatment results in a stronger bond between the seams of the garment.

According to the process of this invention, the composite coating of plasticized polyvinyl partial butyral resin and heat-reactive phenol-formaldehyde is slowly baked for at least twenty minutes at temperatures of 200° to 350° F., preferably for at least thirty minutes at 250° to 300° F. Under these conditions, the polyvinyl partial butyral resin is rendered insoluble in solvents, non-thermoplastic, resistant to water, and surprisingly more compatible with castor oil and other plasticizers under humid conditions. Thus, under the conditions of this process, the heat-reactive phenol-formaldehyde resin polymerizes in the presence of the polyvinyl partial butyral resin and plasticizer in such a way as to render the entire coating insoluble in its original solvents. It is possible that the free hydroxyl groups of the polyvinyl partial butyral resin and of the plasticizer in the case of castor oil, enter into the reaction and become an integral part of the polymerized phenol-formaldehyde resin during the curing. It can be shown that the curing of the phenol-formaldehyde resin separately and then mixing with the polyvinyl partial butyral resin in equivalent quantities does not accomplish the same insolubilizing reaction. The film prepared by the thermal reaction of the phenol-formaldehyde resin in the presence of the polyvinyl partial butyral is rendered water-resistant so that soaking in water or exposing to conditions of high humidity does not cause exudation of the plasticizer. The same film when exposed to high humidity before undergoing sufficient heat treatment to cure the coating completely, is subject to plasticizer exudation, especially when castor oil is used as the plasticizer.

The proportions in which the two types of resin may be combined may be varied widely. Amounts of phenolic resin as low as 20% on a resin basis of the polyvinyl partial butyral resin are nearly as effective in increasing the water-resistance of the polyvinyl partial butyral resin as larger amounts, and amounts of phenolic resin greater than one to one and one-half times the quantity of polyvinyl partial butyral resin do not appear beneficial.

The polyvinyl partial butyral resins preferably employed in this invention are described in Robertson Patent No. 2,162,678. These resins may be defined as derivatives of polyvinyl alcohol in which from about 54% to about 78% of the hydroxyl groups have been combined with butyraldehyde, that is, the polyvinyl partial butyral resin is approximately 54% to 78% acetalized. Within this range, a resin which is approximately 66% acetalized, and which is derived from polyvinyl acetate of molecular weight from about 7000 to about 25,000 is preferred. In general, solutions of polyvinyl partial butyral resins derived from the polyvinyl acetate resins of lower molecular weight have lower viscosities. All of these polyvinyl partial butyral resins contain free hydroxyl groups, which may account for their reactivity with heat-reactive phenol-formaldehyde resins. The exact ratio of acetal to hydroxyl groups in the resin will effect its solubility and its compatibility with resins and with plasticizers. For this reason, the types and the proportions of plasticizers required to impart equivalent flexibility will vary with the vinyl resin used.

The heat-reactive phenol-formaldehyde resins may be prepared by known methods, such as by heating a phenol with an aqueous solution of formaldehyde under reflux in the presence of an alkaline catalyst, such as ammonia or triethanolamine. Preferably, about 5% to 20% molar excess of formaldehyde is employed. The reaction time may vary from thirty minutes to two hours, but, in any event, the reaction is stopped before the resin becomes insoluble in the aqueous mixture. The resin may then be dehydrated, and a volatile solvent added, such as ethanol, butanol, or ethylene glycol monoethyl ether. In some instances, the reaction may advantageously be carried out in the presence of a solvent. Examples of suitable phenols include phenol, cresol, xylenol and similar homologues of phenol.

In the cloth coating composition of this invention, the presence of a suitable plasticizer is essential for the production of a coating which is supple and flexible at ordinary temperatures, and which retains its flexibility at temperatures below 0° F. In addition, the amount of plasticizer must be such that the coating does not block or become tacky at temperatures as high as 180° F. and the plasticizer must not detract from the water-resistance of the coating. In general, any water-insoluble compatible plasticizer is suitable. The amount of plasticizer may vary from 50% to 150% by weight of the polyvinyl partial butyral resin depending on the flexibility which is required and the amount of phenol-formaldehyde resin which is present. It has been found that raw cold-pressed castor oil is an excellent plasticizer in such compositions as it has good water resistance and a high, but not unlimited, degree of compatibility with both the phenol-formaldehyde resin and the polyvinyl partial butyral resin. The castor oil is preferably employed in amounts from 50% to 100% of the vinyl resin. A mixture of castor oil and triethylene glycol di(2-ethylhexoate) is particularly effective as a plasticizer because of the flexibility imparted to the composition at low temperatures. Other preferred plasticizers are linseed oil, triethylene glycol di-2-ethyl butyrate, and triethylene glycol di-n-octoate. Examples of other suitable plasticizers for polyvinyl partial butyral resins are:

Triethylene glycol di(butyryl-lactate)
Triethylene glycol dibutyrate
1 to 4 carbon atom alkyl ethers of triethylene glycol benzoate (particularly the methyl, ethyl and butyl ethers)
Ethyl ether of pentaethylene glycol acetate
Cyclohexyl ether of ethylene glycol acetate
Di(ethoxy ethyl) adipate
Di(methoxy ethyl) succinate
Dioctyl phthalate
Dioctyl maleate
Tricresyl phosphate
Dibutyl tartrate
Dioctyl tartrate
Glyceryl diacetate
Methyl ether of tetraethylene glycol
Ethyl ether of tetraethylene glycol The heating or baking operations described herein do not volatilize significant quantities of the plasticizers, but nevertheless eliminate the undesirable tack and low softening point of the uncured coatings. The cured coatings are supple and flexible.

The resistance of the baked coating to blocking can be further improved by adding to the coating, higher fatty acids, such as oleic acid; natural or synthetic waxes, or hydrocarbon lubricants.

When a pigmented coating composition is to be applied, as is the case when material suitable for raincoats is to be fabricated, the penetration of the pigmented coating into the cloth may be controlled, and difficulty with pinhole formation reduced, by treatment of the cloth with suitable primer compositions. An excellent primer coating composition for this purpose is a highly plasticized composition containing a thermoplastic polyvinyl partial butyral resin. If the primer coat contains a high percentage of plasticizer, the appearance or "hand" of the coating will be improved because fiber locking is prevented. The addition of a black dye and carbon black pigment to the primer coating will improve the hiding power of the coating. The primer coating may be applied in such amount as to deposit from about ¼ to 1 ounce of residue per square yard.

In making coatings for army raincoats, suitable pigments and filler should be employed so that a top coating of about 3 ounces per square yard on a dry basis will have adequate hiding and covering power and will be of regulation deep olive drab color. The pigments may be dispersed in the plasticizer on a stone mill or in a pebble mill. The waxes, if employed, may also be dispersed in the plasticizer-pigment combination. The pigment dispersion is then mixed with a solution of the polyvinyl partial butyral resin and the heat-hardenable phenol-formaldehyde resin in a suitable solvent, such as a lower aliphatic alcohol.

The following examples will serve to illustrate the invention.

*Example 1*

The following is an example of a coating composition containing but a single plasticizer and which was applied over cloth without a primer. The following ingredients were mixed to form a coating composition of these proportions.

| | Per cent |
|---|---|
| Polyvinyl partial butyral resin | 12.6 |
| Heat reactive phenol-formaldehyde resin (60% solution in ethanol) | 12.6 |
| Oleic acid | 0.6 |
| Yellow iron oxide pigment | 2.3 |
| Black iron oxide pigment | 3.2 |
| Lead titanate | 1.9 |
| Whiting | 7.6 |
| Raw castor oil | 9.5 |
| Ethanol (190 proof) | 33.2 |
| Acetone | 16.5 |
| | 100.0 |

The above lacquer was applied to cloth by knife-coating and the deposited solids were air-dried to remove solvents. The coated cloth was then baked for one hour at 250° F. An olive drab coated cloth was obtained which was flexible and water resistant, and the coating was insoluble in alcohols. The heat-treated cloth did not adhere to itself when the coated surfaces were pressed together at 180° F. for thirty minutes under a pressure of 0.25 pound per square inch.

The cloth may be coated on both sides, and, if coated on one side only, the other side may be given any of the well known water-repellent treatments. The coated cloth may be used for raincoats, ponchos, tarpaulins, inflatable equipment, such as balloons; gun coverings, tents, ski clothes, sanitary sheeting and the like.

Example 2

A composition of the following ingredients was prepared:

| | Per cent |
|---|---|
| Polyvinyl partial butyral resin | 12.6 |
| Heat-reactive cresol-formaldehyde resin (60% solution in ethanol) | 12.6 |
| Castor oil | 9.5 |
| Oleic acid | 0.6 |
| Black iron oxide pigment | 3.2 |
| Yellow iron oxide pigment | 2.3 |
| Lead titanate | 1.9 |
| Whiting | 7.6 |
| Ethanol (190 proof) | 33.2 |
| Acetone | 16.5 |
| | 100.0 |

A primer coating of the following composition was prepared:

| | Parts by weight |
|---|---|
| Polyvinyl partial butyral resin | 20 |
| Raw castor oil | 20 |
| Oleic acid | 7 |
| Ethanol (190 proof) | 38 |
| Acetone | 15 |

The primer coating was applied to cloth, where, after baking, it served to control the degree of penetration of the pigmented lacquer and to prevent objectionable wetting and locking of the cotton fibers by the pigment. The primer coating was baked for five minutes at 200° to 225° F.

Two coats of the pigmented lacquer were then applied to form a total thickness of pigmented lacquer of about three ounces per square yard. Each coat was baked for two minutes to remove the solvent. The coated cloth was then baked for one hour at 250° F. The coated surfaces did not block at 180° F. and the coated cloth was flexible at 0° F. The coatings were alcohol-insoluble after baking, and they showed no water-blush on immersion in water for twenty-four hours.

Example 3

This example illustrates a coating containing two plasticizers adapted to impart good water-resistance and low temperature flexibility, and also containing an additional synthetic wax ingredient specifically, a synthetic wax having a melting point of about 137°–139° C. and which is a reaction product of stearic acid or similar higher fatty acid and ethylene diamine. The composition of the coating was as follows:

| | Parts |
|---|---|
| Polyvinyl partial butyral resin | 12.6 |
| Heat-reactive phenol - formaldehyde resin (60% solution in ethanol) | 12.6 |
| Oleic acid | 0.6 |
| Synthetic wax | 0.0126 |
| Yellow iron oxide pigment | 2.3 |
| Black iron oxide pigment | 3.2 |
| Lead titanate | 1.9 |
| Whiting | 7.6 |
| Castor oil | 10.0 |
| Triethylene glycol di(2-ethyl hexoate) | 2.5 |
| Ethanol (190 proof) | 21.9 |
| Butanol | 12.5 |
| Hydrogenated petroleum naphtha | 12.3 |
| | 100.0 |

A primer coating composition was also prepared of the following composition:

| | Per cent |
|---|---|
| Polyvinyl partial butyral resin | 15.0 |
| Black dye | 1.0 |
| Carbon black | 1.0 |
| Raw castor oil, cold pressed | 15.0 |
| Triethylene glycol di(2-ethyl hexoate) | 15.0 |
| Ethanol (190 proof) | 38.0 |
| Hydrogenated petroleum naphtha | 15.0 |
| | 100.0 |

The primer coating in an amount of about one-half ounce per square yard was applied to a cloth of suitable strength, followed by two coats of the pigmented lacquer to form a coating whose total weight was about 3 ounces per square yard. Each coat was baked for 2 minutes at 180° F. to remove solvents. When the coating was finally baked for a minimum of 30 minutes at 275° F., a coated cloth was obtained which more than met government specifications (PQD71D) for vinyl resin coated material for raincoats.

The coated cloth could be fashioned into raincoats before the heat treatment without premature reaction, so that the coated fabric and seams of the garment could be cured after assembly. The minimum adhesion of the cured coating to the cloth was six pounds per inch, and the minimum adhesion of the seams and stripping in the curved raincoats was three pounds per inch as measured by the force necessary to separate the coating from the cloth, or to split the seams, employing test strips one inch wide. The coated cloth withstood a minimum of 30 pounds per square inch hydrostatic pressure without leaking, whereas the specifications call for a minimum of 15 pounds. At 280° to 300° F., there was no adhesion of the coated surfaces under a pressure of 0.25 pound per square inch, whereas the specifications call for a minimum temperature of 180° F. Likewise, at 180° F. and higher temperatures, the coating did not soften and was not otherwise damaged. At 0° F., the coated cloth did not crack nor did it lose more than 50% of its hydrostatic resistance. Even at −40° F. as compared with the specification temperature of 0° F., the coating was still flexible. When the coated cloth was heated for five hours at 105° C., there was no appreciable change in the flexibility.

The coating had a film strength of at least 20 pounds pull on the bias when determined according to the above specifications, and the burning time for a strip one inch by six inches was at least 20 seconds. Upon aging the coated cloth in an oxygen bomb for eight days, the coating neither became stiff and brittle nor soft and tacky. After leaching the coated cloth with water for twenty-four hours there was no appreciable change in the flexibility of the coated cloth. The coated cloth withstood the water spray test for 100 hours plus, whereas specifications state that the coating shall not leak or become soft, nor shall their hydrostatic resistance or adhesion be lowered below specification requirements after only a two-hour water spray.

*Example 4*

The following pigmented coated composition was prepared:

| | Parts |
|---|---|
| Polyvinyl partial butyral resin | 12.6 |
| Heat-reactive phenol-formaldehyde resin (60% solution in ethanol) | 6.3 |
| Iron oxide, black | 3.2 |
| Iron oxide, yellow | 2.3 |
| Lead titanate | 1.9 |
| Whiting | 7.6 |
| Synthetic wax (as described in Example 3) | 0.0126 |
| Raw castor oil, cold pressed | 10.00 |
| Triethylene glycol di-2-ethylhexoate | 2.5 |
| Oleic acid | 0.6 |
| Butanol | 12.5 |
| Ethanol (190 proof) | 28.1 |
| Hydrogenated petroleum naphtha | 12.4 |
| | 100.0 |

This coating was applied over a primer coating of the same composition as that of Example 3, and in the same manner. Upon baking the coating for 60 minutes at 275° F., a coating was obtained which also met government specifications PQD71D. This coating was more flexible than that of Example 3, but its resistance to moisture was not quite as good. Thus, the optimum ratio of phenol resin to vinyl resin depends upon balancing the flexibility desired against the required moisture resistance.

When the uncured coated cloth is fashioned into raincoats, it is often desirable to use a cement for bonding the seams. A cement formulation which yields satisfactory results in this operation is as follows:

| | Parts |
|---|---|
| Polyvinyl partial butyral resin | 18 |
| Heat-reactive phenol-formaldehyde resin (60% solution in ethanol) | 9 |
| Dibutyl phthalate | 18 |
| Hydrogenated rosin | 18 |
| Acetone | 24 |
| Ethanol (190 proof) | 13 |
| | 100 |

This formulation yields a solution of a pasty consistency suitable for "finger" spreading. If the cement is to be applied by brushing, thinning with suitable solvents, such as alcohols or esters is required. Better results are often obtained if the coated cloth is brushed with ethanol or butanol before applying the adhesive. The cemented seams are cured along with the cloth coating during the final baking operation.

The formulas shown in the foregoing examples are illustrative of the invention, but they may be modified within the properties delineated. Thus, other solvents for the polyvinyl partial butyral resin may be employed, such as ethylene glycol monoethyl ether, diacetone alcohol, ethyl acetate, methyl acetate and butyl acetate, and diluents other than petroleum naphtha include toluene and xylene. However, the lower aliphatic alcohols are preferred as solvents. All such modifications of the invention are included within the scope of the invention as defined in the appended claim.

I claim:

A coating composition comprising the following ingredients in parts by weight:

| | |
|---|---|
| Polyvinyl partial butyral resin | 12.6 |
| Thermosetting phenol-formaldehyde resin (60% solution in ethanol) | 12.6 |
| Oleic acid | 0.6 |
| Yellow iron oxide pigment | 2.3 |
| Black iron oxide pigment | 3.2 |
| Lead titanate | 1.9 |
| Whiting | 7.6 |
| Castor oil | 10.0 |
| Triethylene glycol di(2-ethylhexoate) | 2.5 |
| Ethanol (190 proof) | 21.9 |
| Butanol | 12.5 |
| Hydrogenated petroleum naphtha | 12.3 |

RICHARD W. QUARLES.

REFERENCES CITED

The following references are of record in the file of this patent:

UNITED STATES PATENTS

| Number | Name | Date |
|---|---|---|
| 2,045,130 | Fix | June 23, 1936 |
| 2,120,927 | Blair et al. | June 14, 1938 |
| 2,195,254 | Miller | Mar. 26, 1940 |
| 2,243,560 | Hall et al. | May 27, 1941 |
| 2,268,121 | Kingsley | Dec. 30, 1941 |
| 2,274,672 | Dennison | Mar. 3, 1942 |
| 2,276,305 | Hershberger | Mar. 17, 1942 |
| 2,302,557 | Langkammerer | Nov. 17, 1942 |
| 2,307,588 | Jackson et al. | Jan. 5, 1943 |
| 2,336,792 | Langkammerer | Dec. 14, 1943 |
| 2,356,250 | Land | Aug. 22, 1944 |
| 2,396,098 | Haas | Mar. 5, 1946 |

FOREIGN PATENTS

| Number | Country | Date |
|---|---|---|
| 416,412 | Great Britain | Sept. 10, 1934 |

OTHER REFERENCES

Vinylite Resins—Gen'l Properties and Uses, page 11, pub. May 1937 by Carbide and Carbon Chem. Corp., New York.

Gilman, "Organic Chem.," vol. I, pages 755, 756, pub. 1943 by John Wiley and Sons, New York.

Vinylite Resins—Their Forms, Properties and Uses, page 17, pub. 1944 by Carbide and Carbon.